United States Patent
Nishioka

(10) Patent No.: US 10,075,023 B2
(45) Date of Patent: Sep. 11, 2018

(54) WIRELESS COMMUNICATION APPARATUS AND METHOD FOR CONTROLLING WIRELESS COMMUNICATION APPARATUS

(71) Applicant: Panasonic Intellectual Property Management Co., Ltd., Osaka (JP)

(72) Inventor: Shinichiro Nishioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 10 days.

(21) Appl. No.: 15/254,682

(22) Filed: Sep. 1, 2016

(65) Prior Publication Data
US 2016/0373167 A1 Dec. 22, 2016

Related U.S. Application Data

(63) Continuation of application No. PCT/JP2014/004820, filed on Sep. 19, 2014.

(30) Foreign Application Priority Data

Mar. 5, 2014 (JP) ................................ 2014-043174

(51) Int. Cl.
*G08C 17/00* (2006.01)
*H02J 50/12* (2016.01)
(Continued)

(52) U.S. Cl.
CPC .............. *H02J 50/12* (2016.02); *H02J 7/025* (2013.01); *H02J 50/40* (2016.02); *H02J 50/80* (2016.02);
(Continued)

(58) Field of Classification Search
CPC ............. H04B 5/0037; H04B 7/01617; H04W 40/244; H04L 45/54; H04L 45/745
(Continued)

(56) References Cited

U.S. PATENT DOCUMENTS

2009/0146503 A1 6/2009 Kawabata
2009/0231225 A1 9/2009 Choudhury et al.
(Continued)

FOREIGN PATENT DOCUMENTS

JP 2007-267110 10/2007
JP 2009-253762 10/2009
(Continued)

OTHER PUBLICATIONS

International Search Report dated Dec. 9, 2014 in corresponding International Application No. PCT/JP2014/004820.
(Continued)

*Primary Examiner* — Chi H Pham
*Assistant Examiner* — Alexander O Boakye
(74) *Attorney, Agent, or Firm* — Wenderoth, Lind & Ponack, L.L.P.

(57) ABSTRACT

A wireless communication apparatus includes: a wireless communication unit configured to perform directional wireless communication with an external apparatus; a wireless power supply unit configured to perform wireless power supply to the external apparatus; a sector management unit configured to store a plurality of IDs each indicating a communication parameter which is set for the wireless communication unit in order to determine an antenna pattern for the wireless communication unit, and a power supply parameter which is set for the wireless power supply unit in order to determine an antenna pattern for the wireless power supply unit; and a control unit configured to control the directional wireless communication and the wireless power supply based on an ID included in the plurality of IDs.

17 Claims, 11 Drawing Sheets

(51) Int. Cl.
*H02J 7/02* (2016.01)
*H02J 50/40* (2016.01)
*H02J 50/80* (2016.01)
*H04B 7/06* (2006.01)
*H04B 5/00* (2006.01)
*H04W 40/24* (2009.01)

(52) U.S. Cl.
CPC ......... *H04B 5/0037* (2013.01); *H04B 7/0617* (2013.01); *H04B 7/0695* (2013.01); *H04W 40/244* (2013.01)

(58) Field of Classification Search
USPC .......................................................... 370/311
See application file for complete search history.

(56) References Cited

U.S. PATENT DOCUMENTS

| | | |
|---|---|---|
| 2009/0232010 A1 | 9/2009 | Li et al. |
| 2009/0232023 A1 | 9/2009 | Soffer et al. |
| 2009/0254766 A1 | 10/2009 | Yamasuge |
| 2010/0056062 A1 | 3/2010 | Zhang et al. |
| 2010/0109843 A1 | 5/2010 | Sugaya |
| 2012/0056485 A1 | 3/2012 | Haruyama |
| 2012/0129470 A1* | 5/2012 | Tandai ................ H04W 76/023 455/73 |
| 2012/0147802 A1* | 6/2012 | Ukita ................ H04W 52/0216 370/311 |
| 2013/0155907 A1 | 6/2013 | Soffer et al. |
| 2014/0204859 A1 | 7/2014 | Cordiero et al. |
| 2014/0206304 A1 | 7/2014 | Zhang et al. |
| 2015/0156759 A1 | 6/2015 | Cordeiro et al. |
| 2016/0181703 A1 | 6/2016 | Choudhury et al. |

FOREIGN PATENT DOCUMENTS

| | | |
|---|---|---|
| JP | 2010-114961 | 5/2010 |
| JP | 2011-514058 | 4/2011 |
| JP | 2012-501591 | 1/2012 |
| JP | 2012-60721 | 3/2012 |
| WO | 2009/114628 | 9/2009 |

OTHER PUBLICATIONS

"IEEE Std 802.11ad™—2012, Part 11: Wireless LAN Medium Access Control (MAC) and Physical Layer (PHY) Specifications Amendment 3: Enhancements for Very High Throughput in the 60 GHz Band", IEEE Standard, Dec. 28, 2012, URL:http://standards.ieee.org/getieee802/download/802.11ad-2012.pdf.

* cited by examiner

FIG. 11

| Direction | CDOWN | Sector ID | DMG Antenna ID | RXSS Length |
|---|---|---|---|---|
| B0 | B1   B9 | B10   B15 | B16   B17 | B18   B23 |

Bits: 1, 9, 6, 2, 6

WIRELESS COMMUNICATION APPARATUS AND METHOD FOR CONTROLLING WIRELESS COMMUNICATION APPARATUS

CROSS REFERENCE TO RELATED APPLICATIONS

This is a continuation application of PCT International Application No. PCT/JP2014/004820 filed on Sep. 19, 2014, designating the United States of America, which is based on and claims priority of Japanese Patent Application No. 2014-043174 filed on Mar. 5, 2014. The entire disclosures of the above-identified applications, including the specifications, drawings and claims are incorporated herein by reference in their entirety.

FIELD

The present disclosure relates to a wireless communication apparatus which performs wireless power supply and highly directional wireless communication.

BACKGROUND

In the field of wireless power supply, recent years have seen focus on techniques for allowing highly efficient wireless supply of electric power ranging from several watts to several kilo watts in a near distance range of within several meters, such as an electromagnetic resonance method indicated in Patent Literature 1. Such techniques are desired to be put to practical use for charging batteries of mobile appliances, electric automobiles, etc.

CITATION LIST

Patent Literature

PTL 1
Japanese Unexamined Patent Application Publication No. 2012-60721

Non Patent Literature

NPL 1
"IEEE Std 802.11ad-2012, Part 11: Wireless LAN Medium Access Control (MAC) and Physical Layer (PHY) Specifications Amendment 3: Enhancements for Very High Throughput in the 60 GHz Band", [online], IEEE Standard, [searched on Feb. 5, 2012], Internet <URL: http://standards.ieee.org/getieee802/download/802.11ad-2012.pdf>

SUMMARY

Technical Problem

In wireless power supply, in order to maintain high power supply efficiency, there is a need to appropriately set parameters for wireless power supply such as a resonance frequency and an impedance which affect the efficiency of wireless power supply. However, there is room for consideration regarding the method for setting such parameters for wireless power supply.

The present disclosure provides a wireless communication apparatus capable of setting parameters for wireless power supply efficiently.

Solution to Problem

A wireless communication apparatus according to the present disclosure includes a wireless communication unit configured to perform directional wireless communication with an external apparatus; a wireless power supply unit configured to perform wireless power supply to the external apparatus; a sector management unit configured to store a plurality of IDs each indicating a communication parameter which is set for the wireless communication unit in order to determine an antenna pattern for the wireless communication unit, and a power supply parameter which is set for the wireless power supply unit in order to determine an antenna pattern for the wireless power supply unit; and a control unit configured to control the directional wireless communication and the wireless power supply based on an ID included in the plurality of IDs. In the trial control, the control unit is configured to select, in an order, each of the plurality of IDs stored in the sector management unit, and perform, on each of the plurality of IDs selected: (i) a communication trial conforming to a beam forming protocol according to a sector sweep method, by setting a communication parameter indicated by the ID selected for the wireless communication unit, and causing the wireless communication unit to transmit an electric wave including the ID selected, and (ii) a power supply trial by causing the wireless power supply unit, for which the power supply parameter indicated by the ID selected has been set, to transmit an electric wave.

Advantageous Effects

With the wireless communication apparatus according to the present disclosure, it is possible to set parameters for wireless power supply efficiently.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 11 is a diagram illustrating a format of a sector sweep area.

DESCRIPTION OF EMBODIMENTS

Figure 1:
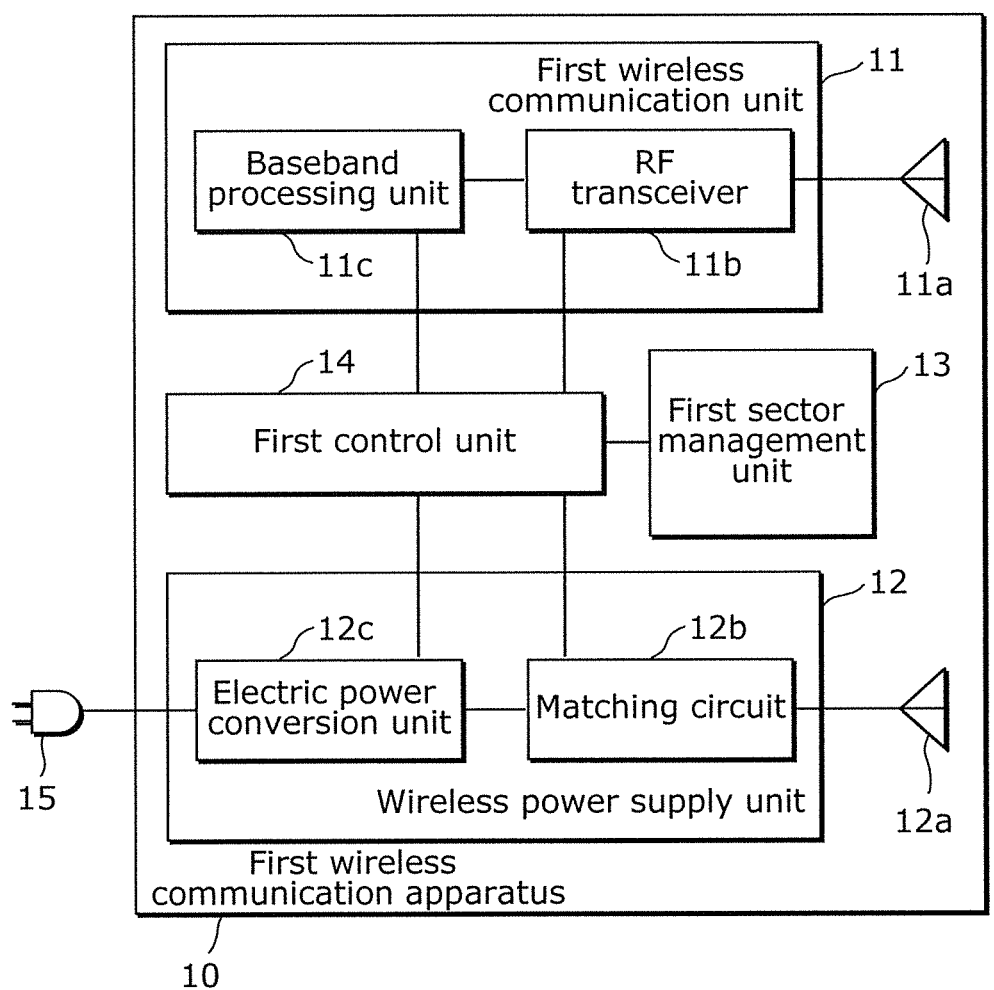
FIG. 1 is a block diagram illustrating a configuration of a wireless communication apparatus at a power supply side according to Embodiment 1.

Underlying Knowledge Forming Basis of the Present Disclosure

In recent years, in the field of wireless communication, there are shortages in frequency bands of 6 GHz and below which are widely used for mobile communication, wireless local area network (LAN), wireless personal area network (PAN), etc. For this reason, in order to increase a communication speed significantly, millimeter waves which enable use of wider band widths have been focused.

For example, in the IEEE802.11ad standard (Non Patent Literature 1), a beam forming protocol according to a sector sweep method is applied to address problems relating to attenuation in millimeter wave signals and multiple paths. Thus, the IEEE802.11ad standard enables non line of sight (NLOS) communication performed at 7 Gbps at the maximum.

On the other hand, in the field of wireless power supply, techniques for allowing highly efficient wireless supply of electric power ranging from several watts to several kilo watts in a near distance range of within several meters, such as the electromagnetic resonance method as indicated in Patent Literature 1 have been focused. Such techniques are desired to be put to practical use for charging batteries of mobile appliances, electric automobiles, etc.

Parameters for wireless power supply such as a resonance frequency and an impedance which affect the efficiency of wireless power supply significantly vary depending on change in the relational positions of an apparatus at a power supply side and an apparatus at a power reception side, and operation states (variations in loads) of the respective apparatuses. For this reason, in order to maintain a high power supply efficiency, there is a need to dynamically set power supply parameters.

Here, in order to dynamically set parameters for wireless power supply between the apparatus at the power supply side and the apparatus at the power reception side which are apart by several meters, wireless communication for setting parameters for wireless power supply is required. In this case, wireless communication for setting parameters for wireless power supply may decrease communication throughput of user data which should be communicated in the first place.

In view of this, the inventor has invented a wireless communication apparatus capable of efficiently setting parameters for wireless power supply without decreasing communication throughput of user data.

Hereinafter, embodiments are described in detail referring to the drawings as necessary. It is to be noted that unnecessarily detailed descriptions may not be provided. For example, already well-known matters may not be described in detail, and substantially the same constituent elements may not be described repeatedly. This is to prevent the following descriptions from becoming redundant unnecessarily, and to help any person skilled in the art to understand the present disclosure.

It is to be noted that the inventor provides the attached drawings and the following descriptions to help any person skilled in the art to fully understand the present disclosure.

Therefore, the attached drawings and the following descriptions are not intended to limit the subject matters of the claims.

Embodiment 1

Configuration

Figure 2:
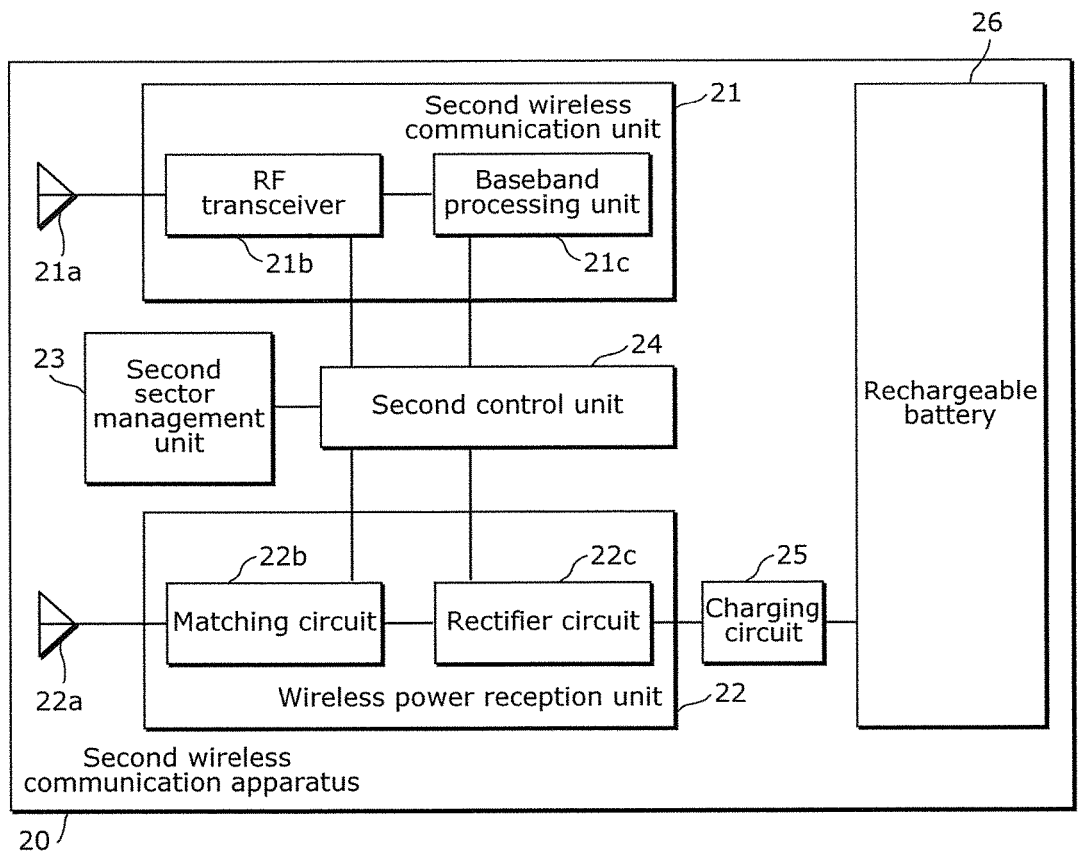
FIG. 2 is a block diagram illustrating a configuration of a wireless communication apparatus at a power reception side according to Embodiment 1.

Configurations of wireless communication apparatuses according to Embodiment 1 are described with reference to FIGS. 1 and 2. FIG. 1 is a block diagram illustrating a configuration of a first wireless communication apparatus 10 at a power supply side according to Embodiment 1. FIG. 2 is a block diagram illustrating a configuration of a second wireless communication apparatus 20 at a power reception side according to Embodiment 1.

First, the configuration of the first wireless communication apparatus 10 is described with reference to FIG. 1.

The first wireless communication apparatus 10 illustrated in FIG. 1 is a wireless communication apparatus which supplies power to the second wireless communication apparatus 20 illustrated in FIG. 2. In addition, in wireless communication between the first wireless communication apparatus 10 and the second wireless communication apparatus 20, the first wireless communication apparatus 10 operates as a master unit in the wireless communication. In other words, the first wireless communication apparatus 10 operates as a PBSS control point (PCP)/access point (AP) defined in IEEE802.11ad.

The first wireless communication apparatus 10 includes: a first wireless communication unit 11; a wireless power supply unit 12; a first sector management unit 13; a first control unit 14; and a power source plug 15.

The first wireless communication unit 11 performs highly directional wireless communication conforming to the aforementioned IEEE802.11ad standard, with a wireless communication apparatus opposing the first wireless communication apparatus 10. In other words, the first wireless communication unit 11 performs directional wireless communication with the opposing external apparatus. The first wireless communication unit 11 performs wireless communication in, for example, a frequency band ranging from 57.24 GHz to 65.88 GHz.

The first wireless communication unit 11 includes: a communication antenna 11a for directional communication; a radio frequency (RF) transceiver 11b; and a baseband processing unit 11c.

The communication antenna 11a is an antenna for data communication for sending and receiving high frequency signals (electric waves). The communication antenna 11a is, for example, a phased array antenna including a plurality of antenna elements, and a weight of the plurality of antenna elements is modified by setting communication parameters. In other words, an antenna pattern for the communication antenna 11a is modified according to communication parameters.

It is to be noted that the first wireless communication unit 11 may include a plurality of communication antennas 11a, and that one of the communication antennas 11a may be selected according to communication parameters set by the first control unit 14.

The RF transceiver 11b converts a high frequency signal received by the communication antenna 11a into a baseband signal, and outputs the converted baseband signal to the baseband processing unit 11c. In addition, the RF transceiver 11b converts a baseband signal input by the baseband processing unit 11c into a high frequency signal, and transmits the converted high frequency signal wirelessly from the communication antenna 11a. The RF transceiver 11b is for example a general-use IC or a module.

The baseband processing unit 11c demodulates a baseband signal input from the RF transceiver 11b. In addition, the baseband processing unit 11c converts a signal to be transmitted into a baseband signal, and outputs the converted baseband signal to the RF transceiver 11b. The baseband processing unit 11c is for example a general-use IC or a module.

The wireless power supply unit 12 performs wireless power transmission in a near distance range as in the aforementioned electromagnetic resonance method, with a wireless communication apparatus opposing the first wireless communication apparatus 10, using power supplied via the power source plug 15. In other words, the wireless power supply unit 12 performs wireless power supply to the opposing external apparatus. The wireless power supply unit 12 performs wireless power supply in, for example, a frequency band ranging from 20.05 kHz to 100 kHz.

The wireless power supply unit 12 includes: a power supply antenna 12a; a matching circuit 12b; and an electric power conversion unit 12c.

The power supply antenna 12a is an antenna for generating an alternating current magnetic field using an LC resonator, according to a high frequency signal for power supply generated by the electric power conversion unit 12c. It is to be noted that a plurality of power supply antennas 12a may be provided.

The matching circuit 12b is a circuit for matching an impedance with the opposing wireless communication apparatus via the power supply antenna 12a, and improving a power transmission efficiency. The matching circuit 12b is composed of a variable capacitor, a variable inductor (coil), a variable resistor, etc.

The electric power conversion unit 12c generates a high frequency signal having a desired frequency using an oscillator such as a crystal oscillator, and amplifies the generated high frequency signal using an amplifier, so as to generate a high frequency signal for power supply.

The first sector management unit 13 stores a plurality of IDs each indicating a communication parameter for determining an antenna pattern for the first wireless communication unit 11 and a power supply parameter for determining an antenna pattern for the wireless power supply unit 12. The first sector management unit 13 is a storage media, specifically for example, a semiconductor memory such as a flash memory, a ferrodielectric memory, an hard disc drive (HDD) etc. Each of the aforementioned IDs means a combination ID indicating a combination of the communication parameter for determining the antenna pattern for the first wireless communication unit 11 and the power supply parameter for determining the antenna pattern for the wireless power supply unit 12. In this Specification, the ID is simply referred to as an ID.

Here, the communication parameters stored in the first sector management unit 13 are, for example, (i) invariables (such as an invariable for a variable capacitor, an invariable for a variable inductor, and an invariable for a variable resistor) of a peripheral circuit of a communication antenna 11a, and (ii) frequencies of high frequency signals generated in the RF transceiver 11b. When a plurality of communication antennas 11a are provided to the first wireless communication unit 11, communication parameters include information indicating the communication antenna 11a to be used when the communication parameters among the plurality of communication antennas 11a are set.

In addition, power supply parameters to be stored in the first sector management unit 13 are, for example, (i) invariables (such as an invariable for a variable capacitor, an invariable for a variable inductor, and an invariable for a variable resistor) of the matching circuit 12b, and (ii) frequencies of high frequency signals generated in the electric power conversion unit 12c. When a plurality of power supply antennas 12a are provided to the wireless power supply unit 12, power supply parameters include information indicating the power supply antenna 12a to be used when the power supply parameters among the plurality of power supply antennas 12a are set.

The first control unit 14 performs control of trials including a wireless trial by the first wireless communication unit 11 and a power supply trial by the wireless power supply unit 12. In the trial control, the first control unit 14 specifically performs communication trials conforming to the beam forming protocol according to the sector seep method, using an ID stored in the first sector management unit 13 instead of a sector ID.

In the communication trials, the first control unit 14 selects a plurality of IDs stored in the first sector management unit 13 in an order. In addition, every time the first control unit 14 selects one of the IDs, the first control unit 14 sets the communication parameter indicated by the ID to the first wireless communication unit 11, and causes the first wireless communication unit 11 to transmit an electric wave including the ID to the first wireless communication unit 11.

In addition, every time the first control unit 14 selects one of the IDs in the communication trials, the first control unit 14 performs a power supply trial for causing the wireless power supply unit 12, for which the power supply parameter indicated by the ID has been set, to transmit an electric wave.

The first control unit 14 measures the quality of wireless communication during the communication trial performed by the second wireless communication apparatus 20. The first control unit 14 measures, specifically for example, a signal-noise rate (SNR) and a bit error rate (BER). It is to be noted that such a function may be implemented as a part of the first wireless communication unit 11, or may be implemented as another constituent element (measurement unit).

The power source plug 15 is a plug (power reception unit) to be connected to the external power source (for example, a commercial system) so that the first wireless communication apparatus 10 receives supply of power from outside.

Next, the configuration of the second wireless communication apparatus 20 is described with reference to FIG. 2.

The second wireless communication apparatus 20 is a wireless communication apparatus which receives power from the first wireless communication apparatus 10. In addition, in wireless communication between the first wireless communication apparatus 10 and the second wireless communication apparatus 20, the second wireless communication apparatus 20 operates as a slave unit in the wireless communication. In other words, the second wireless communication apparatus 20 operates as a station (STA) defined in IEEE802.11ad.

The second wireless communication apparatus 20 includes: a second wireless communication unit 21; a wireless power reception unit 22; a second sector management unit 23; a second control unit 24; a charging circuit 25; and a rechargeable battery 26.

The second wireless communication unit 21 performs directional wireless communication with an opposing external apparatus. The second wireless communication unit 21 includes: a communication antenna 21a for directional communication; an RF transceiver 21b; and a baseband processing unit 21c. It is to be noted that the configuration of the second wireless communication unit 21 is similar to that of the first wireless communication unit 11. Thus, the configuration is not described in detail again.

The wireless power reception unit 22 receives supply of power by wireless power transmission in a near distance range such as the aforementioned electromagnetic resonance, from the wireless communication apparatus opposing the second wireless communication apparatus 20. In other words, the wireless power reception unit 22 is provided so that the second wireless communication apparatus 20 can receive power supply wirelessly from the opposing external apparatus. The wireless power reception unit 22 includes: a power reception antenna 22a; a matching circuit 22b; and a rectifier circuit 22c.

The power reception antenna 22a is an antenna which receives a high frequency signal for power supply. It is to be noted that the power reception antenna 22a receives, for example, a high frequency signal to be transmitted from the power supply antenna 12a of the first wireless communication apparatus 10. It is to be noted that a plurality of power reception antennas 22a may be provided.

The matching circuit 22b is a circuit for matching an impedance, and improving a power transmission efficiency. The matching circuit 22b is composed of a variable capacitor, a variable inductor (coil), a variable resistor, etc.

The rectifier circuit 22c is a circuit for converting the high frequency signal received by the power reception antenna 22a into a direct current power. The rectifier circuit 22c is composed of a capacitor and a rectifier diode.

The charging circuit 25 is a circuit for charging rechargeable battery 26 by a direct current power to be output from the rectifier circuit 22c.

The rechargeable battery 26 is a secondary battery which is charged by the charging circuit 25 and functions as a power source of the second wireless communication apparatus 20, and is for example, a lead rechargeable battery, a lithium ion battery, or the like.

The second sector management unit 23 stores a plurality of sector IDs indicating communication parameters for determining antenna patterns of the second wireless communication unit 21. The second sector management unit 23 is a storage media, specifically for example, a semiconductor memory such as a flash memory, a ferrodielectric memory, a hard disc drive (HDD) etc. It is to be noted that the details of each communication parameter are similar to the details of descriptions provided for the first sector management unit 13.

The second control unit 24 performs communication trials as responses to trial control (communication trials each involving transmission of an electric wave for wireless power supply) performed by the first control unit 14. More specifically, the second control unit 24 firstly selects one of the plurality of IDs as a best ID (a target ID), based on at least one of the quality of wireless communication in the communication trial included in the trial control and the amount of power in the wireless power supply.

Subsequently, the second control unit 24 performs communication trials conforming to the beam forming protocol according to the sector sweep method and including the target ID as a response. It is to be noted that the second control unit 24 measures the quality (such as an SNR and a BER) of the wireless communication in the trial control performed by the first wireless communication apparatus 10, and measures the amount of power (power supply efficiency) in the wireless power supply. It is to be noted that the function for measuring the quality of wireless communication may be implemented as a part of the second wireless communication unit 21 or may be implemented as another constituent element. The function for measuring the amount of power supply in the wireless power supply may be implemented as a part of the wireless power supply unit 22, the charging circuit 25, or the like, or may be implemented as another constituent element (measurement unit).

[Communication Trials According to Conventional Sector Sweep Method]

Next, conventional communication trials according to the sector sweep method are described. Each of FIGS. 3 and 4 is a diagram illustrating communication trials using the sector sweep method.

Figure 3:
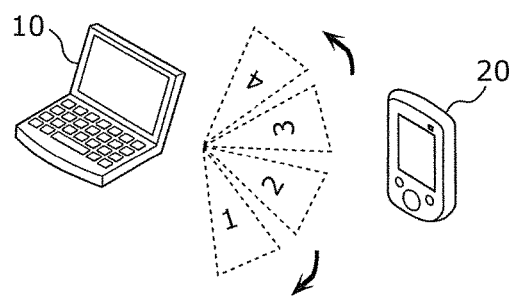
FIG. 3 is a first diagram illustrating communication trials using a sector sweep method.
Figure 4:
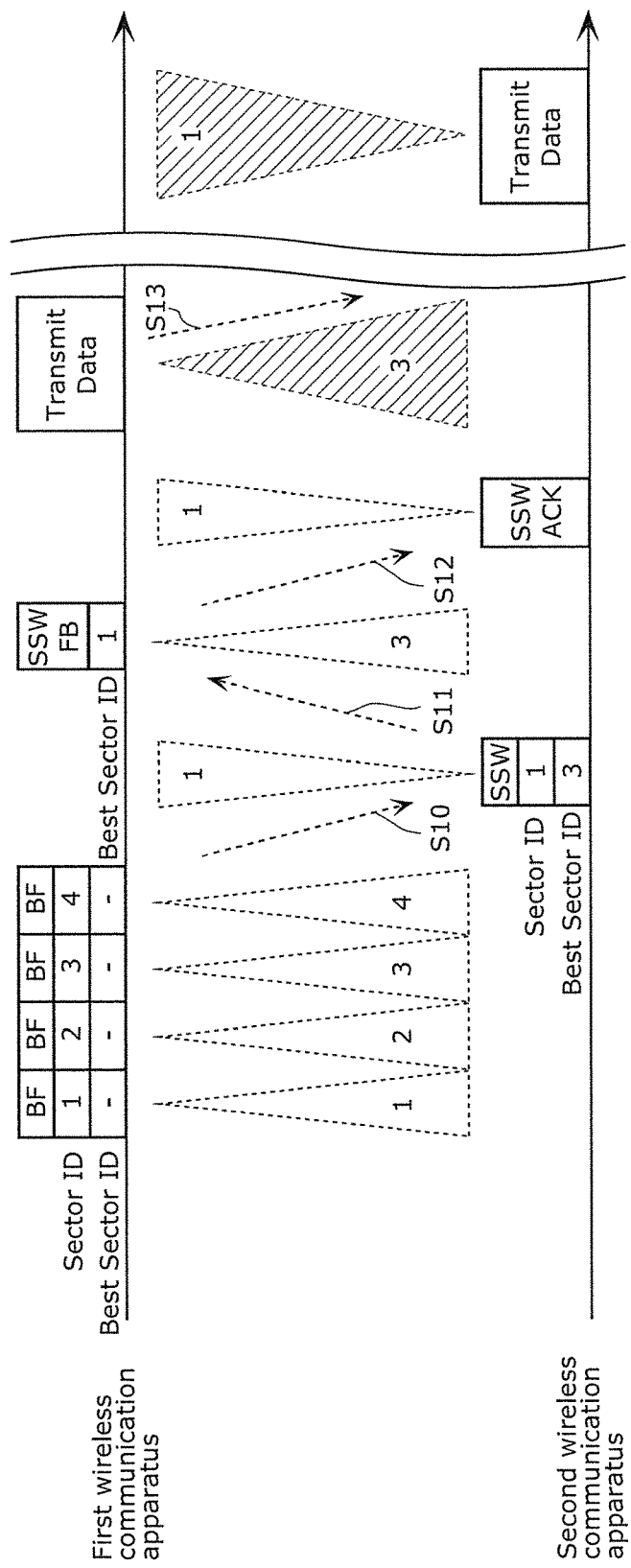
FIG. 4 is a second diagram illustrating communication trials using a sector sweep method.

As illustrated in FIG. 3, when wireless communication is performed between the first wireless communication apparatus 10 (for example, a PC) and the second wireless communication apparatus 20 (for example, a mobile terminal), the optimum value for a communication parameter to be set to the first wireless communication unit 11 varies according to the positional relationship between the both. In order to optimize the communication parameter, communication trials according to the sector sweep method are performed.

In communication trials according to the sector sweep method, the first control unit 14 transmits electric waves while switching sectors which indicate antenna patterns for the first wireless communication unit 11. In other words, each sector is a range to which an electric wave (a beam) irradiated from the first wireless communication unit 11 travels.

For example, the first control unit 14 of the first wireless communication apparatus 10 causes the first wireless communication unit 11 to transmit electric waves toward the sectors 1 to 4 in an order. Hereinafter, a method for transmitting electric waves toward the sectors 1 to 4 in the order is specifically described with reference to FIG. 4.

The first sector management unit 13 stores sector IDs (which are sector ID 1 to sector ID 4) for transmitting electric waves to the sectors 1 to 4, and stores, on each of the sector ID 1 to sector ID 4, a communication parameter to be set for the first wireless communication unit 11 in an associated manner.

The first control unit 14 selects the plurality of sector IDs with reference to the first sector management unit 13 in an order. Every time when the first control unit 14 selects one of the sector IDs, the first control unit 14 causes the first wireless communication unit 11 for which the communication parameter indicated by the selected sector ID has been set to transmit an electric wave (S10 in FIG. 4).

For example, when the sector ID 1 is selected and the communication parameter associated with the sector ID 1 is set to the first wireless communication unit 11, an electric wave is transmitted toward the sector 1. Subsequently, when the sector IDs 2 to 4 are selected, electric waves are transmitted toward the respective sectors 2 to 4.

At this time, each electric wave to be transmitted makes up a signal (beacon signal) including a frame (beacon frame, BF), and a sector ID is included in a sector ID area in the frame. In other words, the electric wave to be transmitted from the first wireless communication unit 11 includes the sector ID.

As described above, while the electric waves are being transmitted toward the sectors 1 to 4 in the order, the second control unit 24 of the second wireless communication apparatus 20 measures the communication quality of the signal obtainable by the electric wave received by the second wireless communication unit 21. More specifically, the second control unit 24 measures the aforementioned SNR, BER, or the like Subsequently, typically, the second control unit 24 transmits, to the second wireless communication unit 21, an electric wave including as a response a sector ID (a best sector ID) of one of the sectors which provides the best communication quality (S11 in FIG. 4). Here, the best sector ID is the sector ID 3.

At this time, actually, the second control unit 24 performs communication trials (transmits electric waves while switching between sectors) including the best sector ID as a response, according to the sector sweep method for determining a communication parameter to be set for the second wireless communication unit 21. In other words, the communication trials are performed bi-directionally.

To simplify the description, it is assumed here that the sector ID 1 stored in the second sector management unit 23 is used in the communication trial performed by the second control unit 24. Accordingly, the electric wave including the best sector ID as the response is transmitted by the second wireless communication unit 21 for which the communication parameter associated with the sector ID 1 in the second sector management unit 23 has been set.

When the first control unit 14 of the first wireless communication apparatus 10 receives the best sector ID via the first wireless communication unit 11, the first control unit 14 sets the communication parameter indicated by the best sector ID and performs the subsequent communication.

More specifically, the first control unit 14 sets the communication parameter indicated by the sector ID 3 to the first wireless communication unit 11 with reference to the first sector management unit 13. Subsequently, the first control unit 14 causes the first wireless communication unit 11 to transmit the electric wave including the sector ID 1 (the best sector ID for setting the communication parameter to the second wireless communication unit 21) as a response in the communication trial performed by the second wireless communication apparatus 20 (S12 in FIG. 4).

In this way, as a result of the communication trial performed by the first wireless communication apparatus 10, a parameter corresponding to the sector ID 3 is set to the first wireless communication unit 11. Subsequently, data transmission is performed by the first wireless communication unit 11 for which the parameter has been set (S13 in FIG. 4).

Such a communication trial is performed on a per predetermined interval basis. Thus, even when the positional relationship between the first wireless communication apparatus 10 and the second wireless communication apparatus 20 is changed, a parameter which provides a good communication quality is to be dynamically set to the first wireless communication unit 11.

[Trial Control According to the Present Disclosure]

Figure 5:
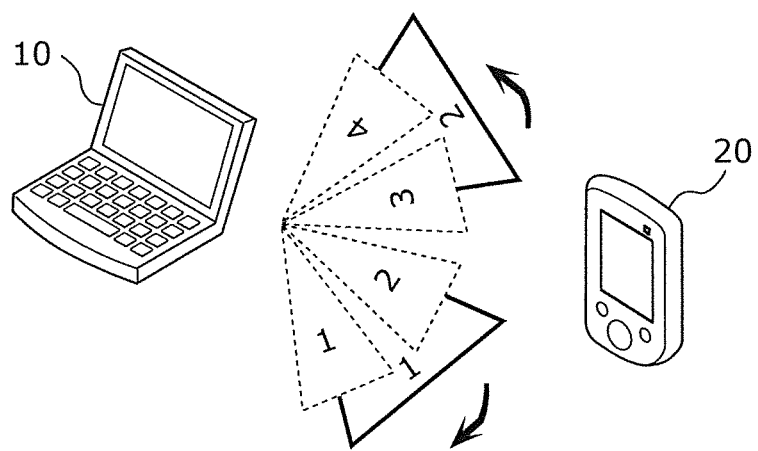
FIG. 5 is a first diagram illustrating trial control according to Embodiment 1.
Figure 6:
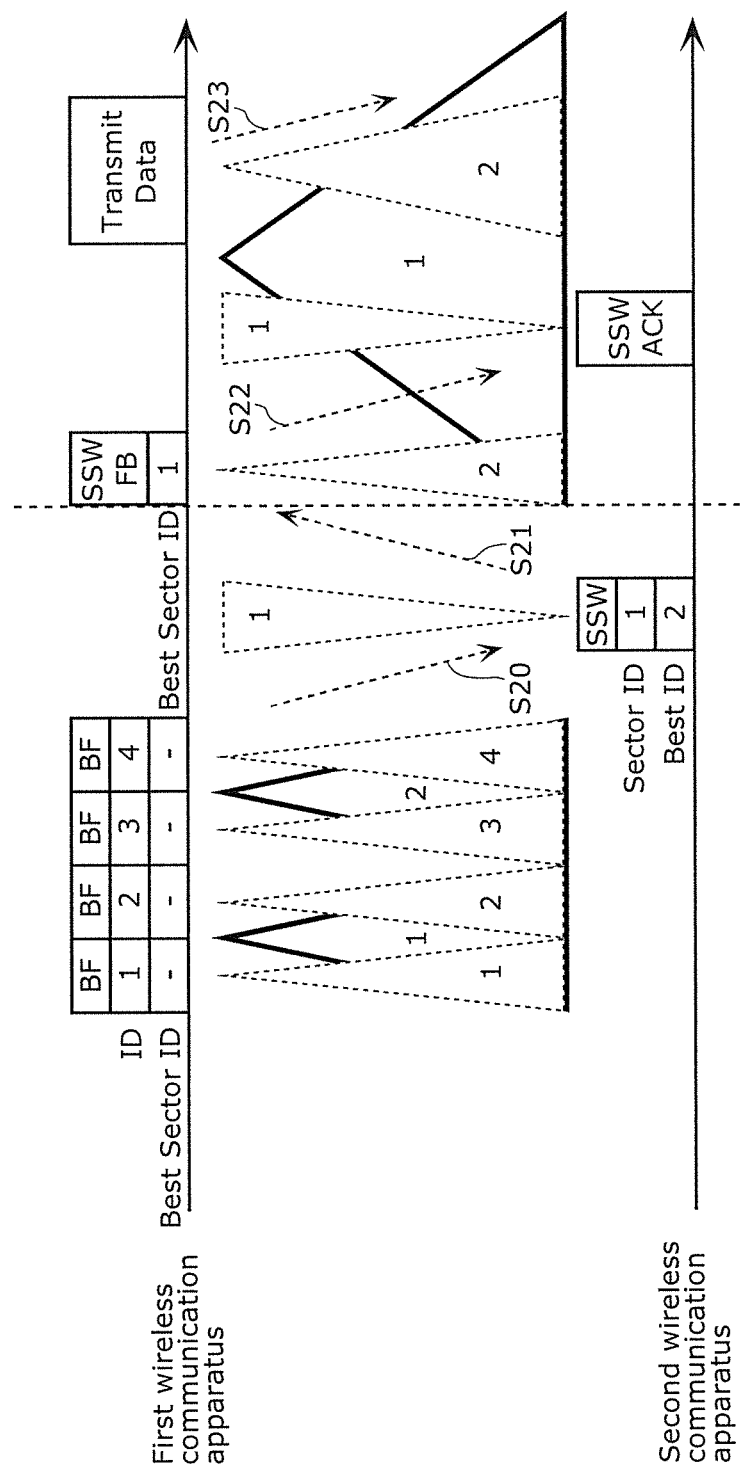
FIG. 6 is a second diagram illustrating the trial control according to Embodiment 1.

Next, a trial control according to the present disclosure is described. Each of FIGS. 5 and 6 is a diagram for illustrating a trial control according to the present disclosure.

The trial control according to the sector sweep method in the present disclosure is firstly characterized in that IDs are stored in the first sector management unit 13. Here, in the first sector management unit 13, the IDs are associated with not only the communication parameters but also with power supply parameters. In this point, the IDs are different from the sector IDs.

In addition, in the trial control according to the sector sweep method in the present disclosure, the first control unit 14 performs a communication trial for selecting an ID instead of a sector ID in the aforementioned communication trial, and in parallel to this performs a power supply trial. More specifically, every time the first control unit 14 selects one of the IDs, the first control unit 14 causes not only the first wireless communication unit 11 but also the wireless power supply unit 12 to set the power supply parameter indicated by the selected ID and to transmit an electric wave.

Next, details of a trial control according to the present disclosure is described. It is to be noted that a sector of the first wireless communication unit 11 is referred to as a communication sector, and a sector of the wireless power supply unit 12 is referred to as a power supply sector in the descriptions below. In the descriptions below, communication parameters corresponding to the communication sectors 1 to 4 are respectively referred to as communication parameters 1 to 4, and power supply parameters corresponding to the power supply sectors 1 and 2 are respectively referred to as power supply parameters 1 and 2.

In addition, in the first sector management unit 13, the ID 1 is associated with the communication parameter 1 and the power supply parameter 1. Likewise, the ID 2 is associated with the communication parameter 2 and the power supply parameter 1, and the ID 3 is associated with the communication parameter 3 and the power supply parameter 2. The ID 4 is associated with each of the communication parameter 4 and the power supply parameter 2.

First, the first control unit 14 selects the plurality of sector IDs with reference to the first sector management unit 13 in an order. Every time when the first control unit 14 selects one of the sector IDs, the first control unit 14 causes the first wireless communication unit 11, for which the communication parameter indicated by the selected sector ID has been set, to transmit an electric wave (S20 in FIG. 6).

For example, when the ID 1 is selected, the communication parameter 1 associated with the ID 1 is set to the first wireless communication unit 11, and an electric wave for communication is transmitted toward the communication sector 1. When the ID 1 is selected, the power supply parameter 1 associated with the ID 1 is set to the wireless power supply unit 12, and an electric wave for power supply is transmitted toward the power supply sector 1.

Subsequently, an electric wave is transmitted toward the communication sector 2 and the power supply sector 1 when the ID 2 is selected, and an electric wave is transmitted toward the communication sector 3 and the power supply sector 2 when the ID 3 is selected. Subsequently, an electric wave is transmitted toward the communication sector 4 and the power supply sector 3 when the ID 4 is selected.

At this time, the electric wave to be transmitted from the first wireless communication unit 11 makes up a signal including a frame, and a sector ID area in the frame includes an ID. In other words, the electric wave to be transmitted from the first wireless communication unit 11 includes the ID.

While the electric waves are being transmitted in the order as described above, the second control unit 24 of the second wireless communication apparatus 20 measures the communication quality of the signal obtainable by the electric wave received by the second wireless communication unit 21. In addition, while the electric waves are being transmitted in the order, the second control unit 24 of the second wireless communication apparatus 20 measures the amount of power (the amount of power supply) obtainable by the electric waves received by the wireless power supply unit 22. It is to be noted that, at this time, semi-non-directional parameters (or nearly semi-non-directional parameters) are set to the second wireless communication unit 21 and the wireless power supply unit 22, in order to measure the communication quality and the amount of power supply.

Subsequently, the second control unit 24 selects the best ID (for example, the ID 2) based on at least one of the communication quality and the amount of power supply, and causes the second wireless communication unit 21 to transmit an electric wave including the best ID as a response (S21 in FIG. 6).

At this time, the electric wave including the best sector ID as the response is transmitted by the second wireless communication unit 21 for which the communication parameter associated with the sector ID 1 in the second sector management unit 23 has been set. It is to be noted that, a communication trial including the best ID as the response is actually performed at this time as described above.

When the first control unit 14 of the first wireless communication apparatus 10 receives an electric wave including the best ID (ID 2) as the response via the first wireless communication unit 11, the first control unit 14 sets the communication parameter 2 indicated by the ID 2 with reference to the first sector management unit 13 to the first wireless communication unit 11. Subsequently, the first control unit 14 causes the first wireless communication unit 11 to transmit the electric wave including the sector ID 1 as a response in the communication trial performed by the second wireless communication apparatus 20 (S22 in FIG. 6).

In addition, at this time, the first control unit 14 sets the power supply parameter 1 indicated by the ID 2 with reference to the first sector management unit 13 to the wireless power supply unit 12.

In this way, as a result of the trial control (communication trial) performed by the first wireless communication apparatus 10, the communication parameter 2 indicated by the ID 2 is set to the first wireless communication unit 11, and subsequently, data transmission is performed by the first wireless communication unit 11 for which the parameter has been set (S23 in FIG. 6).

In addition, as a result of trial control performed by the first wireless communication apparatus 10, the power supply parameter 1 indicated by the ID 2 is set to the wireless power supply unit 12, and subsequently, power is supplied to the second wireless communication apparatus 20 (wireless power supply unit 22) by the wireless power supply unit 12 for which the parameter has been set.

In the trial control according to the present disclosure, it is possible to perform a power supply trial for setting a parameter for wireless power supply in parallel with a communication trial according to the sector sweep method for setting a parameter for wireless communication.

Such trial control (communication trial) is typically performed at a beacon transmission interval (BTI) in a beacon interval. Accordingly, there is no need to perform any power supply trial at the data transmission interval (DTI) for use in communication of user data; the DTI is within the beacon interval. For this reason, under the trial control according to the present disclosure, it is possible to set a parameter for wireless power supply efficiently without decreasing communication throughput of user data.

In addition, since the trial control as described above is performed at the beacon interval, the second wireless communication apparatus 20 is capable of selecting the best ID considering both of the communication quality and the amount of power supply at the beacon interval. Accordingly, even when the positional relationship between the first wireless communication apparatus 10 and the second wireless communication apparatus 20 changes, a parameter based on both of the communication quality and the amount of power supply is dynamically set to the first wireless communication unit 11.

[Operations Performed by Wireless Communication Apparatuses]

Hereinafter, operations performed by the first wireless communication apparatus 10 and the second wireless communication apparatus 20 are described with reference to a flowchart.

Figure 7:
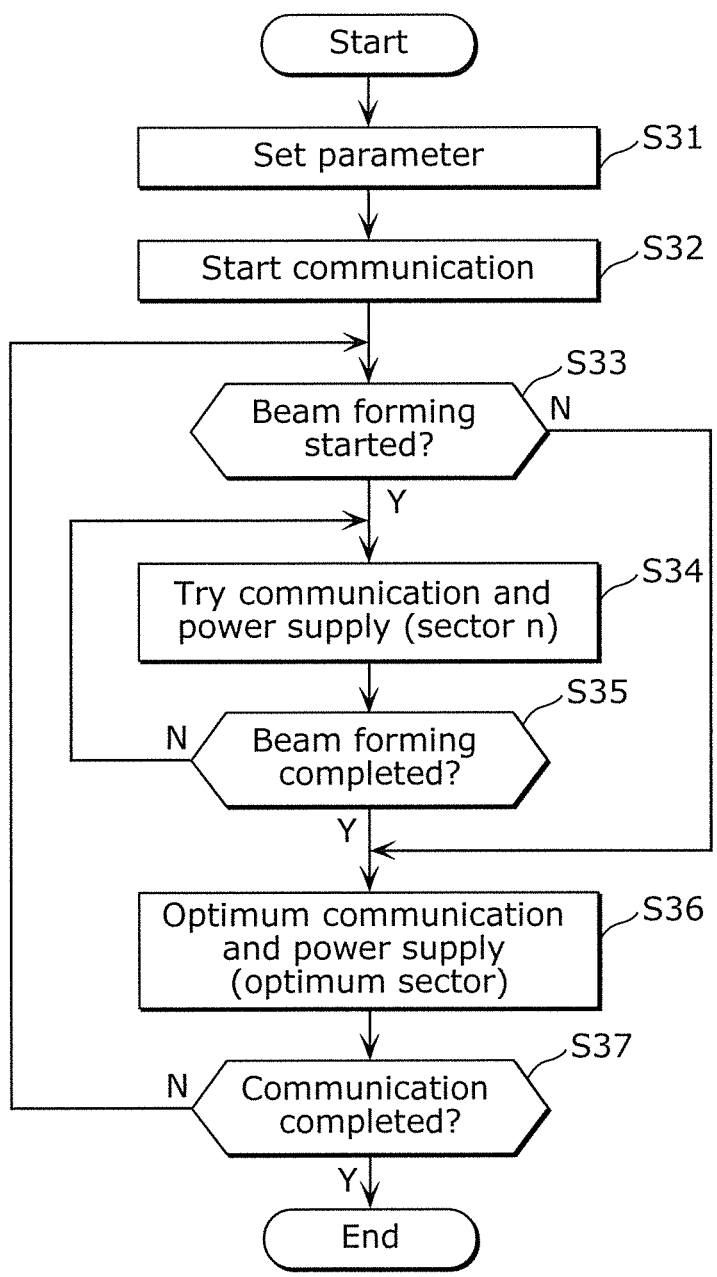
FIG. 7 is a flowchart of operations performed by the wireless communication apparatus at the power supply side.

First, the operations performed by the first wireless communication apparatus 10 are described. FIG. 7 is a flowchart of operations performed by the first wireless communication apparatus 10.

First, in the first wireless communication apparatus 10, an initial parameter is set to each of the first wireless communication unit 11 and the wireless power supply unit 12 (S31), and communication is started (S32).

For example, when beam forming is started (Yes in S33) due to, for example, arrival of a beacon interval (BTI), the aforementioned trial control (the communication trial and the power supply trial) is performed (S34). More specifically, trial control using n (n is an integer of 2 or larger) number of IDs is performed.

After n-pattern sector switching (ID selection) is completed, the first control unit 14 receives the specification of the best ID from the second wireless communication apparatus 20 via the first wireless communication unit 11. The first control unit 14 sets a communication parameter indicated by the specified ID to the first wireless communication unit 11 with reference to the first sector management unit 13, and sets the power supply parameter indicated by the specified ID to the wireless power supply unit 12.

In addition, at this time, the best ID is included in an electric wave in the communication trial performed by the second control unit 24 (in this communication trial, for example, m number of sectors are switched as described later). In view of this, the first control unit 14 transmits the specification of a sector ID as the response to the communication trial performed by the second control unit 24 using the first wireless communication unit 11 after the completion of setting the communication parameters, so as to complete the beam forming (S35). It is to be noted that the first wireless communication apparatus 10 (first control unit 14) measures the communication quality during the communication trial of the second wireless communication apparatus 20, and specifies a sector ID based on the measurement result.

In this way, the electric wave for communication is transmitted to the optimum one of the communication sectors, and the electric wave for power supply is transmitted to the optimum one of the power supply sectors (S36). It is to be noted that the processing in Steps S33 to S36 is repeated (No in S37) until the communication is completed (Yes in S37).

Figure 8:
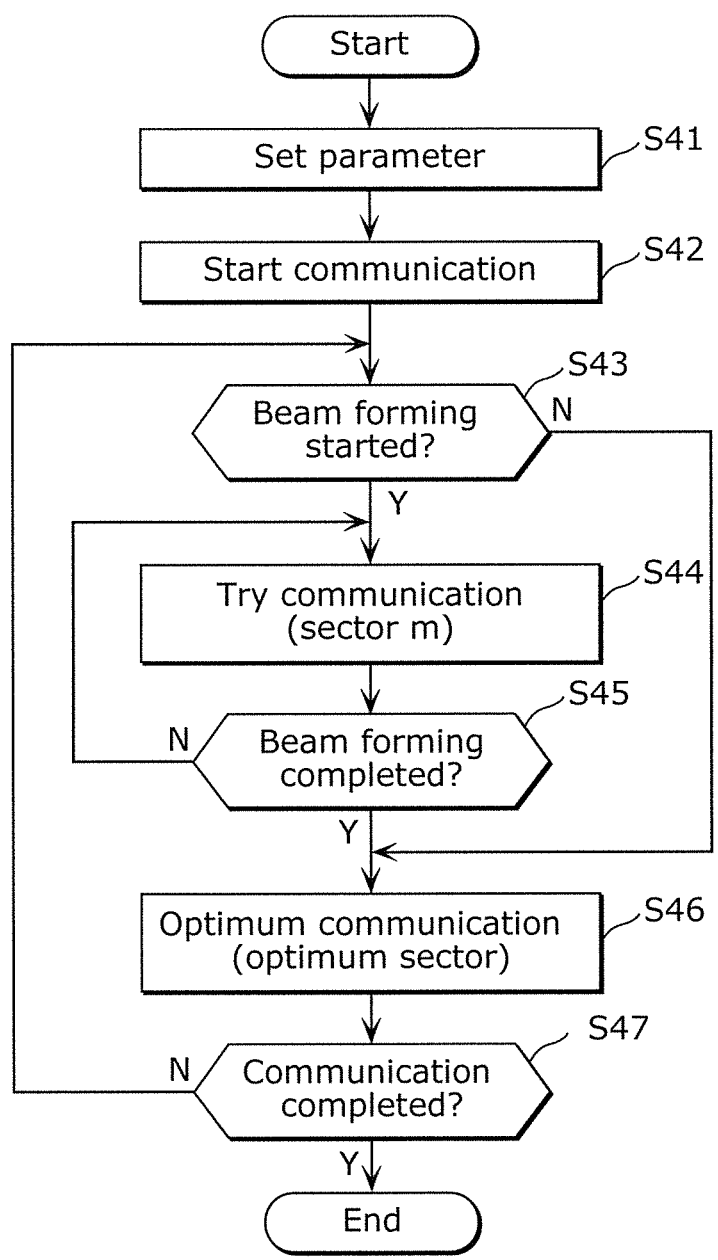
FIG. 8 is a flowchart of operations performed by the wireless communication apparatus at the power reception side.

Next, the operations performed by the second wireless communication apparatus 20 are described. FIG. 8 is a flowchart of operations performed by the second wireless communication apparatus 20.

In the second wireless communication apparatus 20, initial parameters are set to the second wireless communication unit 21 (S41), and communication is started (S42).

For example, when beam forming is started due to, for example, arrival of a beacon interval (BTI) (Yes in S43), the second wireless communication apparatus 20 (the second control unit 24) measures the communication quality and the amount of power supply while the first wireless communication apparatus 10 performs a communication trial (power supply trial). Subsequently, the second wireless communication apparatus 20 selects the best ID (target ID) based on the result of measurement, and performs a communication trial including the selected best ID as a response (S44). More specifically, trial control using m (m is an integer of 2 or larger) number of IDs is performed.

After m-pattern sector switching (ID selection) is completed, the second control unit 24 receives specification of a sector ID from the first wireless communication apparatus 10 via the second wireless communication unit 21. The second control unit 24 sets the communication parameter indicated by the specified sector ID to the second wireless communication unit 21 with reference to the second sector management unit 23, so as to complete the beam forming (S45).

In this way, the electric wave for communication is transmitted to the optimum one of the communication sectors (S46). It is to be noted that the processing in Steps S43 to S46 is repeated (No in S47) until the communication is completed (Yes in S47).

[Details of Beam Forming Operations]

Figure 9:
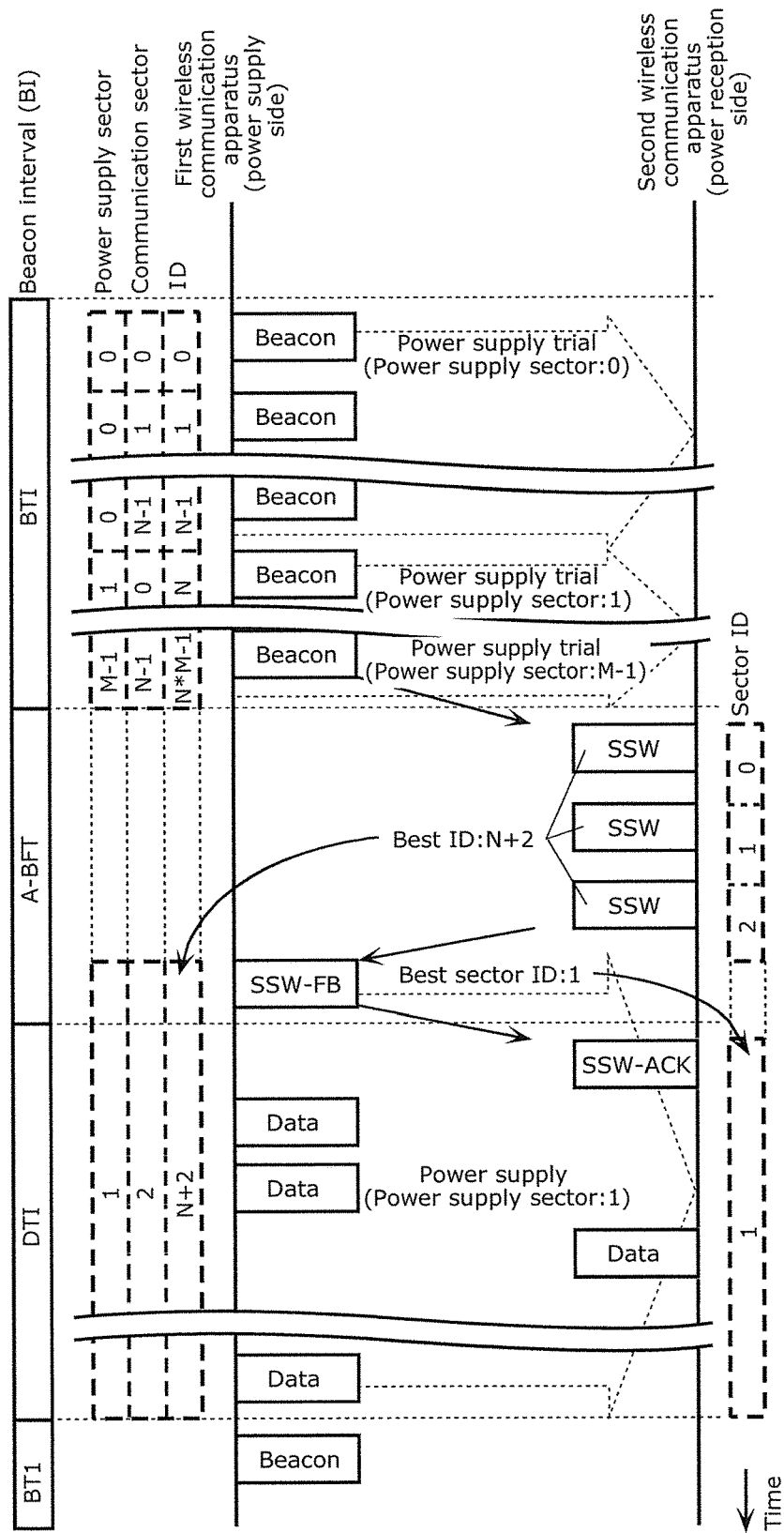
FIG. 9 is a sequence diagram of operations performed by the wireless communication apparatus at the power supply side and the wireless communication apparatus at the power reception side.

Next, details of beam forming operations are described with reference to a sequence diagram. FIG. 9 is the sequence diagram of the beam forming operations. It is assumed that, in the descriptions below, M number of power supply sectors and N number of communication sectors are stored in the first sector management unit 13 in the forms of combinations presented by M*N number of IDs (ranging from 0 to (M*N−1)).

The trial control performed by the first wireless communication apparatus 10 is performed at a BTI which is the beginning of a beacon interval. At the BTI, the first control unit 14 selects the plurality of IDs stored in the first sector management unit 13 in an order from 0 to (M*N−1), and performs settings of the parameters associated with the selected IDs.

In this way, for example, when an ID "N" is selected, an electric wave is transmitted from the first wireless communication unit 11 to the communication sector 0, and an electric wave is transmitted from the wireless power supply unit 12 to the power supply sector 1. It is to be noted that the electric wave transmitted from the first wireless communication unit 11 makes up a signal including a beacon frame (Beacon in FIG. 9). In other words, a BTI is a period in which a beacon frame is transmitted.

Although the order for selecting IDs (a sector sweep order) is not particularly limited, an order according to which the number of times of switching parameters is reduced from the viewpoint of control efficiency. In the example of FIG. 9, power supply sectors (power supply parameters) are not switched during the period in which IDs from 0 to "N" are selected.

In the association beam forming training (A-BFT) that follows the BTI, the second wireless communication apparatus 20 performs a communication trial including the best ID as a response. In other words, the A-BFT is a response period to the beacon frame.

More specifically, the second control unit 24 selects the sector IDs stored in the second sector management unit 23 in an order, and performs settings of communication parameters associated with the selected sector IDs. In this way, for example, when the sector ID 1 is selected, an electric wave is transmitted from the second wireless communication unit 21 to the communication sector 1.

The electric wave transmitted from the second wireless communication unit 21 makes up a signal including a sector sweep frame (an SSW in FIG. 9). Thus, it is to be noted that the best ID is stored in a "sector select" area in the sector sweep frame irrespective of which sector ID is selected. In other words, the electric wave transmitted in the communication trial by the second wireless communication apparatus 20 includes the best ID as the response. In the example of FIG. 9, the best ID is an ID "N+2".

Subsequently, the first control unit 14 of the first wireless communication apparatus 10 sets, to the first wireless communication unit 11, the communication parameter indicated by the ID (best sector ID) specified in the communication trial performed by the second wireless communication apparatus 20. In addition, the first control unit 14 sets the power supply parameter indicated by the specified ID to the wireless power supply unit 12.

Furthermore, the first control unit 14 transmits an electric wave including the specification of the sector ID (best sector ID) to the first wireless communication unit 11. The electric wave at this time makes up a signal including a sector sweep feedback frame (an SSW-FB in FIG. 9), and the best sector ID is stored in a "sector select" area in the frame. In the example of FIG. 9, the best sector ID is a sector ID 1.

When the second control unit 24 of the second wireless communication apparatus 20 receives the best sector ID via the second wireless communication unit 21, the second control unit 24 sets, to the second wireless communication unit 21, the communication parameter indicated by the sector ID specified with reference to the second sector management unit 23.

After the completion of setting parameters to the first wireless communication apparatus 10 and the second wireless communication apparatus 20 as described above, communication of user data is made and power is supplied in the DTI in a beacon interval.

[Method for Transmitting and Receiving IDs]

In the above embodiment, it has been described that an electric wave including an ID instead of a sector ID is transmitted in the communication trial performed by the first wireless communication apparatus 10. Here, a place for storing IDs is described.

Figure 10:
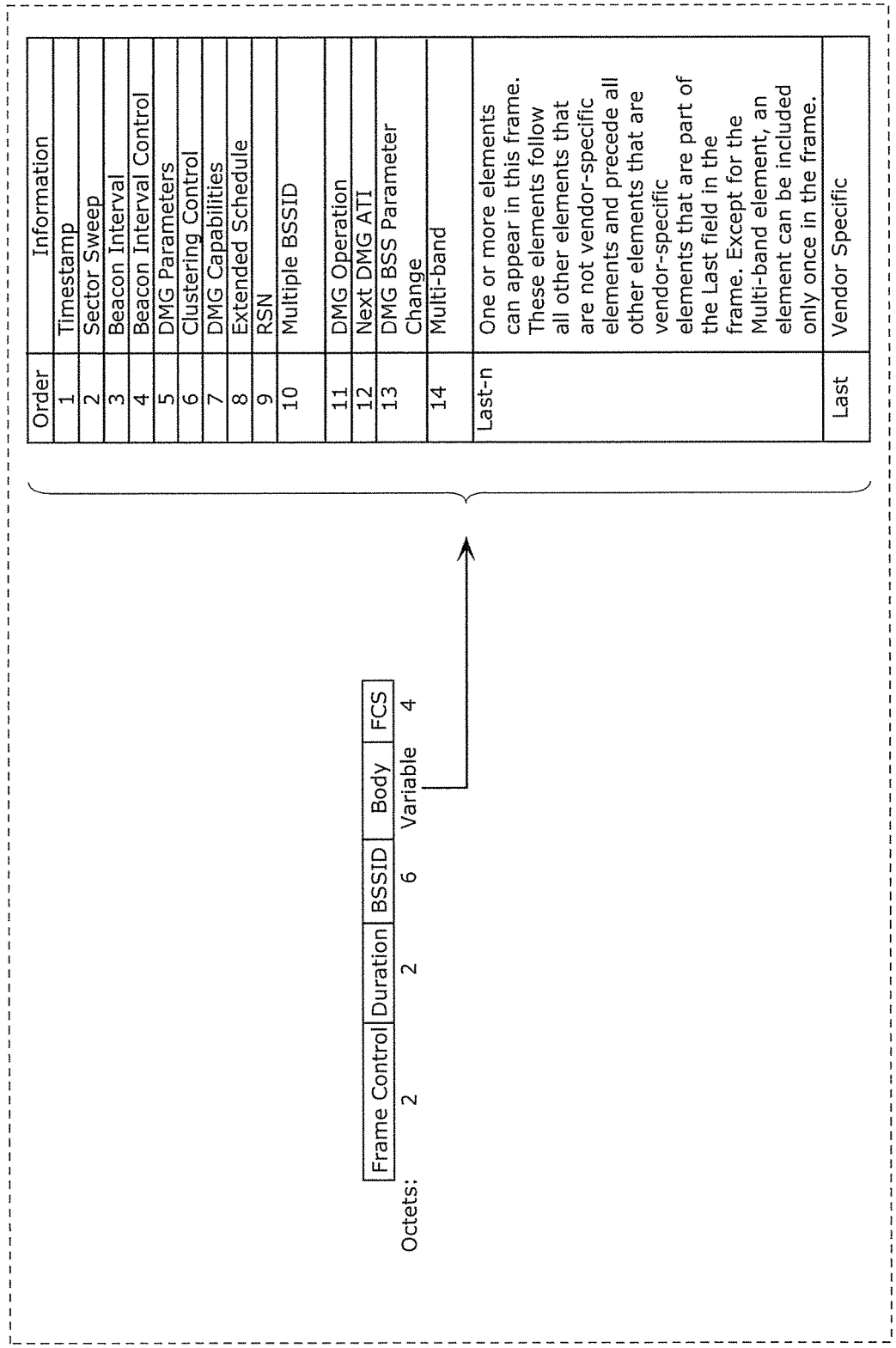
FIG. 10 is a diagram illustrating a format of a beacon frame.

FIG. 10 is a diagram illustrating a format of a beacon frame. FIG. 11 is a diagram illustrating a format of a sector sweep area. It is to be noted that the format illustrated in each of FIGS. 10 and 11 is a format defined in IEEE802.11ad.

The ID transmitted in the communication trial performed by the first wireless communication apparatus 10 is stored in the sector sweep area (Sector Sweep at Order 2 in FIG. 19) in the "Body" of a beacon frame illustrated in FIG. 10. More specifically, the ID is stored in the sector ID area (Sector ID in FIG. 11) in the Sector Sweep area as illustrated in FIG. 11. This area is an area in which a sector ID is stored in a conventional communication trial.

Accordingly, the ID is replaced with a sector ID, conforming to the beam forming protocol standard according to the known sector sweep method. In other words, the ID is different from the conventional sector ID only in the point that the ID is associated with both of the communication parameter and the power supply parameter inside the first sector management unit 13.

Figure 12:
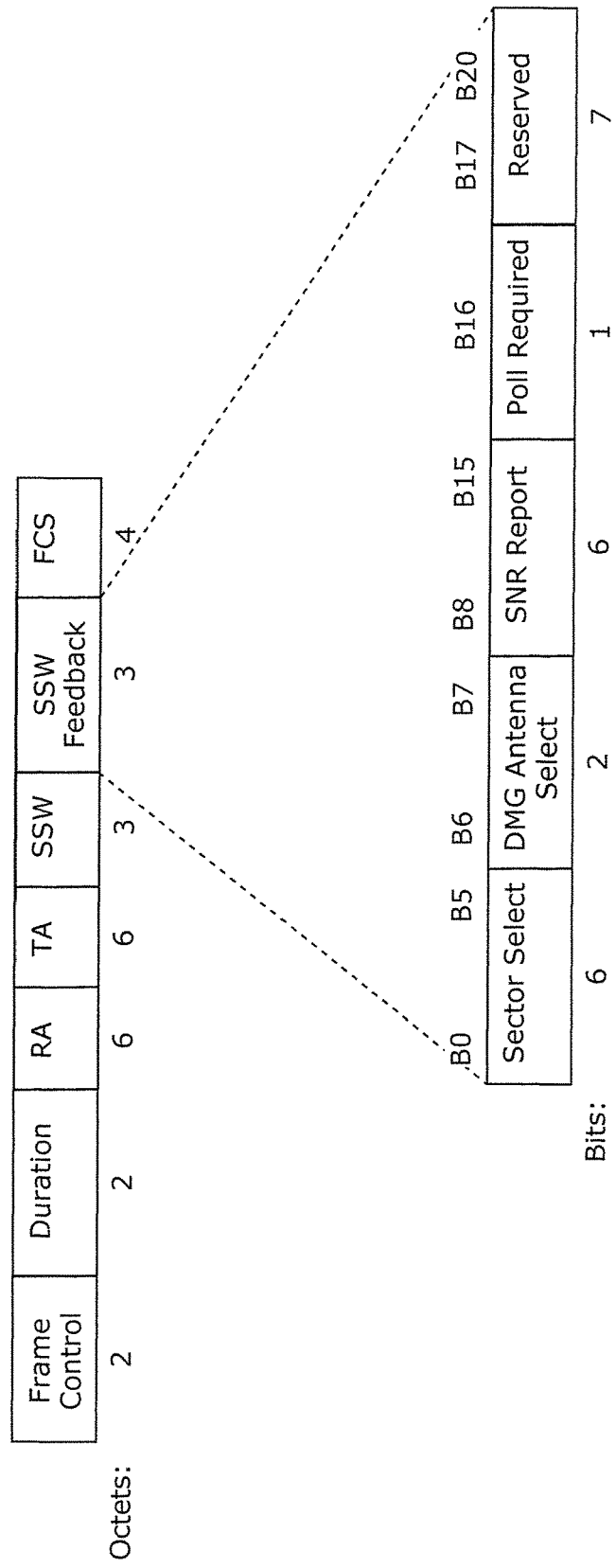
FIG. 12 is a diagram illustrating a format of a sector sweep frame.

Next, a place in which a best ID is stored in the communication trial of the second wireless communication apparatus 20 is described. FIG. 12 is a diagram illustrating a format of a sector sweep frame. It is to be noted that the format illustrated in FIG. 12 is a format defined in IEEE802.11ad.

An electric wave transmitted from the second wireless communication apparatus 20 as a response in the communication trial performed by the first wireless communication apparatus 10 makes up a signal including a sector sweep frame. Here, the ID (best ID) transmitted from the second wireless communication apparatus 20 as the response is stored in a sector sweep feedback area (an SSW Feedback in FIG. 12) of a sector sweep frame. More specifically, the ID is stored in the sector select area (Sector Select in FIG. 12) in the sector sweep feedback area as illustrated in FIG. 12. This area is an area in which a best sector ID is stored in a conventional communication trial.

In this way, the communication trial of the first wireless communication apparatus 10 conforms to the beam forming protocol according to the sector sweep method. More specifically, the communication trial performed by the first wireless communication apparatus 10 conforms to the beam forming protocol according to the sector sweep method defined in IEEE802.11ad. Accordingly, the communication trial performed by the first wireless communication apparatus 10 is superior from the viewpoint of appliance compatibility.

Since a sector ID area corresponds to 6 bits, it is to be noted that available IDs are limited to 64 patterns in the case where IDs are transmitted and received using only sector ID areas. In this case, an antenna ID area (DMB Antenna ID in FIG. 11) may be used, in addition to the sector ID area.

In this case, the ID is a combination of information stored in the sector ID area and information stored in the antenna ID area. In other words, the ID is stored in the sector ID area and the antenna ID area in the beacon frame.

At this time, the ID (best ID) transmitted from the second wireless communication apparatus 20 as the response is stored in the sector select area in the sector sweep feedback areas and the DMG antenna select (DMG Antenna Select in FIG. 12) area.

It is theoretically possible to present 256 ID patterns if the antenna ID area is used in addition to the sector ID area in this way. However, it is to be noted that the number of patterns is limited to approximately 128 ID patterns in consideration of the length (time width) of the BTI.

In addition, when increasing the number of IDs, for example, it is also good to transmit and receive IDs using the Last Order (Vendor Specific) area in FIG. 10, in addition to the sector ID area.

[Method for Selecting IDs for Wireless Communication Apparatus at the Power Reception Side]

Next, the method for selecting an ID (a best ID) by the second wireless communication apparatus 20 is described. As described above, the second control unit 24 selects one of the plurality of IDs received in the trial control as the best ID (target ID), based on at least one of the wireless communication quality and the amount of power in the wireless power supply during the trial control (the communication trial involving the power supply trial) performed by the first control unit 14. Methods for selecting a best ID performed at this time are not particularly limited.

For example, when the amount of power in the wireless power supply is prioritized, the second control unit 24 selects an ID received when the amount of power in the wireless power supply is largest as the best ID during the trial control performed by the first wireless communication apparatus 10 (external apparatus). On the other hand, when the wireless communication quality is prioritized, the second control unit 24 selects an ID received when the wireless communication quality is best as the best ID during the trial control performed by the first wireless communication apparatus 10.

In addition, for example, the second control unit 24 may select the best ID based on both of the wireless communication quality and the amount of power in the wireless power supply.

For example, the second control unit 24 may select as the best ID the ID received when the wireless communication quality is best from among one or more IDs received when the amount of power in the wireless power supply is at or above a predetermined value, during the trial control performed by the first wireless communication apparatus 10. As a result, the ID which provides a good wireless communication quality is selected while the amount of power is maintained at or above the predetermined value. It is to be noted that "at or above the predetermined value" typically means that the amount of power in the wireless power supply is at or above the predetermined amount of power.

In addition, for example, the second control unit 24 may select as the best ID the ID which maximizes the amount of power in the wireless power supply at the time when the ID is received from among one or more IDs received when the wireless communication quality is at or above a predetermined value, during the trial control performed by the first wireless communication apparatus 10. As a result, the ID which provides a good wireless communication quality is selected while the wireless communication quality is maintained at or above the predetermined value. It is to be noted that "at or above the predetermined value" typically means that the wireless communication quality is better than a predetermined quality.

In addition, the second control unit 24 may calculate, on each ID, a first value which increases as the amount of power increases and a second value which increases as the wireless communication quality increases. In this case, the second control unit 24 may select as the best ID the ID which maximizes a total of the first value and the second value, or may select as the best ID the ID which maximizes a weighted sum of the first value and the second value.

Other Embodiments

As described above, Embodiment 1 has been described as an example of a technique disclosed in the present application. However, the technique according to the present disclosure is not limited to the embodiment, and is applicable to embodiments obtainable by arbitrarily making modification, replacement, addition, omission, etc. In addition, it is also possible to obtain new embodiments by combining any of the constituent elements described in Embodiment 1.

In view of this, other embodiments are described collectively below.

In the above embodiment, the first wireless communication apparatus 10 operates as a master unit, and the second wireless communication apparatus 20 operates as a slave unit. However, the first wireless communication apparatus 10 may operate as a slave unit, and the second wireless communication apparatus 20 operates as a master unit.

In this case, in the BTI, a conventional communication trial is performed by the second wireless communication apparatus 20. As a response to this communication trial, trial control is performed by the first wireless communication apparatus 10 in the A-BFT.

In addition, in this case, an electric wave for communication to be transmitted from the first wireless communication apparatus 10 makes up a signal including a sector sweep frame. The ID is stored in a sector ID area (Sector ID in FIG. 11) in a sector sweep area (SSW in FIG. 12, this part is configured in the same manner as in FIG. 11) of a sector sweep frame. It is to be noted that, in the response (specification of a best ID) to the trial control performed by the first wireless communication apparatus 10, the ID is stored in the sector select area (not illustrated) of the sector feedback area (not illustrated) in the sector sweep feedback frame.

In addition, in the above embodiment, a first set of IDs included in the plurality of IDs and a second set of IDs included in the plurality of IDs different from the IDs in the first set of IDs may be stored in the first sector management unit 13. Furthermore, the first control unit 14 may select the ID from either the first set of IDs or the second set of IDs, depending on the communication quality of the directional wireless communication.

Here, for example, the first set of IDs is assumed to include a plurality of IDs each associated with parameters (a communication parameter and a power supply parameter) prioritizing an electric wave arrival distance to an electric wave arrival range. On the other hand, the second set of IDs is assumed to include a plurality of IDs each associated with parameters prioritizing an electric wave arrival distance to an electric wave arrival range.

In this case, after the first control unit 14 performs a communication trial using the first set of IDs, when the communication quality at the time when a response from the second wireless communication apparatus 20 is being received is smaller than a predetermined value, the first control unit 14 performs a communication trial using the second set of IDs in the next communication trial.

As described above, since the IDs indicate communication parameters and power supply parameters, it is feared that the number of IDs increases excessively. The number of IDs for use in each communication trial can be reduced by selectively using either the first set of IDs or the second set of IDs. Thus, an ID is selected efficiently.

It is to be noted that, each of the constituent elements (for example, the first control unit 14 and/or the second control unit 24) in each of the above-described embodiments may be configured in the form of an exclusive hardware product, or may be implemented by executing a software program suitable for the constituent element. Each of the constituent elements may be implemented by means of a program executing unit, such as a CPU and a processor, reading and executing the software program recorded on a recording medium such as a hard disk or a semiconductor memory.

It is to be noted that these general and specific aspects of the present disclosure may be implemented using a system, a method, an integrated circuit, a computer program, or a computer-readable recording medium such as a CD-ROM. In addition, these general and specific aspects of the present disclosure may be implemented as a combination of any of a system, a method, an integrated circuit, a computer program, and a recording medium.

As described above, the embodiments have been described as examples of a technique according to the present disclosure. For illustrative purposes only, the drawings and detailed descriptions have been provided.

Accordingly, the constituent elements illustrated in the attached drawings and described in the detailed descriptions may include not only constituent elements which are essential to solve the problems but also constituent elements which are provided for the purpose of illustrating the technique using the examples and thus are not essential to solve the problems. For this reason, such inessential constituent elements should not be interpreted as being essential directly based on the fact that such inessential constituent elements are illustrated in the attached drawings and described in the detailed descriptions.

In addition, since each of the embodiments is provided for the purpose of illustrating the technique according to the present disclosure using the examples, it is possible to make various kinds of modification, replacement, addition, omission, etc. within the scope of the claims or the scope equivalent thereto.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The wireless communication apparatus according to the present disclosure is applicable as an apparatus capable of setting parameters for wireless power supply efficiently, and is applicable to, for example, a wireless LAN router, a PC, mobile terminals such as a smart phone, a tablet terminal, a gaming machine, etc.

The invention claimed is:

1. A wireless communication apparatus, comprising:
a wireless communication unit configured to perform directional wireless communication with an external apparatus;
a wireless power supply unit configured to perform wireless power supply to the external apparatus;
a sector management unit configured to store a plurality of IDs each indicating a communication parameter which is set for the wireless communication unit in order to determine an antenna pattern for the wireless communication unit, and a power supply parameter which is set for the wireless power supply unit in order to determine an antenna pattern for the wireless power supply unit; and
a control unit configured to control the directional wireless communication and the wireless power supply based on an ID included in the plurality of IDs,
wherein the control unit is configured to select, in an order, each of the plurality of IDs stored in the sector management unit, and perform, on each of the plurality of IDs selected: (i) a communication trial by setting a communication parameter indicated by the ID selected for the wireless communication unit, and causing the wireless communication unit to transmit an electric wave including the ID selected, and (ii) a power supply trial by causing the wireless power supply unit, for which the power supply parameter indicated by the ID selected has been set, to transmit an electric wave.

2. The wireless communication apparatus according to claim 1,
wherein the communication trial conforms to a beam forming protocol according to a sector sweep method.

3. The wireless communication apparatus according to claim 1,
wherein, after the communication trial, when the wireless communication unit receives specification of the ID from the external apparatus, the control unit is configured to (i) set the communication parameter indicated by the ID specified to the wireless communication unit with reference to the sector management unit and cause the wireless communication unit to execute the directional wireless communication, and (ii) set the power supply parameter indicated by the ID specified to the wireless power supply unit with reference to the sector management unit and cause the wireless power supply unit to execute the wireless power supply.

4. The wireless communication apparatus according to claim 1,
wherein, in the communication trial, the electric wave transmitted by the wireless communication unit constitutes a signal of a frame, and the ID is included in a sector ID area in the frame.

5. The wireless communication apparatus according to claim 1,
wherein, in the communication trial, the electric wave transmitted by the wireless communication unit constitutes a signal of a frame, and the ID is included in a sector ID area and an antenna ID area in the frame.

6. The wireless communication apparatus according to claim 1,
wherein, in the communication trial, the electric wave transmitted by the wireless communication unit constitutes a signal of a frame, and the ID is included in a sector ID area and a beacon vendor specific area in the frame.

7. The wireless communication apparatus according to claim 1,
the wireless communication apparatus operating as a master unit in the directional wireless communication,
wherein the control is performed in a period in which a beacon frame is transmitted.

8. The wireless communication apparatus according to claim 1,
the wireless communication apparatus operating as a slave unit in the directional wireless communication,
wherein the control is performed in a response period to a beacon frame.

9. The wireless communication apparatus according to claim 1,
wherein the sector management unit is configured to store a first set of IDs included in the plurality of IDs, and a second set of IDs included in the plurality of IDs different from the first set of IDs, and
the control unit is configured to select the ID from either the first set of IDs or the second set of IDs by switching between the first set of IDs and the second set of IDs, depending on a communication quality of the directional wireless communication.

10. A wireless communication apparatus, comprising:
a wireless communication unit configured to perform directional wireless communication with a wireless communication unit of an external apparatus;
a wireless power reception unit which receives wireless power supply from a wireless power supply unit of the external apparatus; and
a control unit configured to select, as a target ID, one of a plurality of IDs based on at least one of a communication quality of the directional wireless communication in a communication trial and an amount of power in the wireless power supply, after the external apparatus performs the communication trial in which the plurality of IDs are used and transmission of an electric wave for the wireless power supply is involved, and perform a communication trial in which the target ID is included as a response,
wherein, in the external apparatus, the target ID is associated with a communication parameter for determining an antenna pattern for the wireless communication unit of the external apparatus and a power supply parameter for determining an antenna pattern for the wireless power supply unit of the external apparatus.

11. The wireless communication apparatus according to claim 10,
wherein the control unit is configured to select, as the target ID, an ID received when the amount of power in the wireless power supply is largest during the communication trial performed by the external apparatus.

12. The wireless communication apparatus according to claim 10,
wherein the control unit is configured to select, as the target ID, an ID received when the communication quality of the directional wireless communication is best among one or more IDs including an ID received when the amount of power in the wireless power supply is at a predetermined value or above during the communication trial performed by the external apparatus.

13. The wireless communication apparatus according to claim 10,
wherein the control unit is configured to select, as the target ID, an ID received when the communication quality of the directional wireless communication is best during the communication trial performed by the external apparatus.

14. The wireless communication apparatus according to claim 10,
wherein the control unit is configured to select, as the target ID, an ID received when the amount of power in the wireless power supply is largest among one or more IDs including an ID received when the communication quality of the directional wireless power supply is indicated as a predetermined value or above during the communication trial performed by the external apparatus.

15. The wireless communication apparatus according to claim 10,
wherein the communication trial performed by the control unit conforms to a beam forming protocol according to a sector sweep method.

16. A method for controlling a wireless communication apparatus,
the wireless communication apparatus including:
a wireless communication unit which performs directional wireless communication with an external apparatus;
a wireless power supply unit which performs wireless power supply to the external apparatus; and
a sector management unit which stores a plurality of IDs each indicating a communication parameter which is set for the wireless communication unit in order to determine an antenna pattern for the wireless communication unit, and a power supply parameter for the wireless power supply unit, the power supply parameter being set for the wireless power supply unit,
the method comprising selecting, in an order, each of the plurality of IDs stored in the sector management unit, and performing, on each of the plurality of IDs selected: (i) a communication trial by setting a communication parameter indicated by the ID selected for the wireless communication unit, and causing the wireless communication unit to transmit an electric wave including the ID selected, and (ii) a power supply trial by causing the wireless power supply unit, for which the power supply parameter indicated by the ID selected has been set, to transmit an electric wave.

17. A method for controlling a wireless communication apparatus, the wireless communication apparatus including:
a wireless communication unit which performs directional wireless communication with a wireless communication unit in an external apparatus; and
a wireless power supply unit for receiving power wirelessly from the wireless power supply unit in the external apparatus,
the method comprising selecting, as a target ID, one of a plurality of IDs based on at least one of a communication quality of the directional wireless communication in a communication trial and an amount of power in the wireless power supply, after the external apparatus performs the communication trial in which the plurality of IDs are used and transmission of an electric wave for the wireless power supply is involved, and performing a communication trial in which the target ID is included as a response,
wherein, in the external apparatus, the target ID is associated with a communication parameter for determining an antenna pattern for the wireless communication unit of the external apparatus and a power supply parameter for determining an antenna pattern for the wireless power supply unit of the external apparatus.

* * * * *